(12) United States Patent
Burrow et al.

(10) Patent No.: US 7,949,721 B2
(45) Date of Patent: May 24, 2011

(54) SUBNET MANAGEMENT DISCOVERY OF POINT-TO-POINT NETWORK TOPOLOGIES

(75) Inventors: Stephen R. Burrow, Austin, TX (US); Alan Monarchi, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/037,048

(22) Filed: Feb. 25, 2008

(65) Prior Publication Data

US 2009/0216853 A1 Aug. 27, 2009

(51) Int. Cl.
*G06F 15/16* (2006.01)
*G06F 15/173* (2006.01)
*G06F 15/177* (2006.01)

(52) U.S. Cl. ......... 709/208; 709/249; 370/231; 370/237

(58) Field of Classification Search .......... 709/208, 709/217–228; 370/231, 237
See application file for complete search history.

(56) References Cited

U.S. PATENT DOCUMENTS

| | | | |
|---|---|---|---|
| 3,643,227 A | 2/1972 | Smith et al. | |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,524,212 A | 6/1996 | Somani et al. | |
| 5,777,987 A | 7/1998 | Adams et al. | |
| 6,073,181 A | 6/2000 | Holland et al. | |
| 6,289,386 B1 | 9/2001 | Vangemert | |
| 6,483,804 B1 | 11/2002 | Muller et al. | |
| 6,507,567 B1 | 1/2003 | Willars | |
| 6,741,552 B1 | 5/2004 | McCrosky et al. | |
| 6,862,609 B2 * | 3/2005 | Merkey | 709/214 |
| 6,993,032 B1 | 1/2006 | Dammann et al. | |
| 7,093,024 B2 | 8/2006 | Craddock et al. | |
| 7,200,704 B2 * | 4/2007 | Njoku et al. | 710/316 |
| 7,283,473 B2 | 10/2007 | Arndt et al. | |
| 7,290,077 B2 * | 10/2007 | Gregg et al. | 710/263 |
| 7,366,813 B2 * | 4/2008 | Gregg et al. | 710/263 |
| 7,467,402 B2 | 12/2008 | Pennington et al. | |
| 7,602,774 B1 * | 10/2009 | Sundaresan et al. | 370/381 |
| 7,613,183 B1 | 11/2009 | Brewer et al. | |
| 2001/0014954 A1 | 8/2001 | Purcell et al. | |
| 2001/0030943 A1 | 10/2001 | Gregg et al. | |
| 2002/0107903 A1 | 8/2002 | Richter et al. | |

(Continued)

OTHER PUBLICATIONS

Jeong et al.; A study on TCP Buffer Management Algorithim for Improvement on Network Performance in Grid Environment; 2004 pp. 281-288.

(Continued)

*Primary Examiner* — Haresh N Patel

(74) *Attorney, Agent, or Firm* — Cantor Colburn LLP; Steven Chiu

(57) ABSTRACT

A computer program product for subnet management discovery of point-to-point network topologies includes a tangible storage medium readable by a processing circuit and storing instructions for execution by the processing circuit for performing a method. The method includes discovering a local portion of a subnet representing the point-to-point network, the discovering facilitated by a coupling subnet manager configured to act as a master subnet manager on the local portion of the subnet, interpreting a state of a physical port associated with the coupling subnet manager, and discovering a remote portion of the subnet physically connected to the physical port based on the interpreting.

17 Claims, 7 Drawing Sheets

U.S. PATENT DOCUMENTS

| | | | |
|---|---|---|---|
| 2002/0194245 | A1 | 12/2002 | Simpson et al. |
| 2003/0005039 | A1* | 1/2003 | Craddock et al. ............ 709/203 |
| 2003/0061379 | A1 | 3/2003 | Craddock et al. |
| 2004/0123068 | A1 | 6/2004 | Hashimoto |
| 2004/0202189 | A1 | 10/2004 | Arndt et al. |
| 2004/0221070 | A1 | 11/2004 | Ortega, III et al. |
| 2005/0018669 | A1* | 1/2005 | Arndt et al. ............ 370/389 |
| 2005/0060445 | A1 | 3/2005 | Beukema et al. |
| 2005/0120237 | A1 | 6/2005 | Roux et al. |
| 2005/0144313 | A1 | 6/2005 | Arndt et al. |
| 2006/0048214 | A1 | 3/2006 | Pennington et al. |
| 2006/0230185 | A1 | 10/2006 | Errickson et al. |
| 2006/0230209 | A1* | 10/2006 | Gregg et al. ............ 710/263 |
| 2006/0230219 | A1* | 10/2006 | Njoku et al. ............ 710/316 |
| 2007/0239963 | A1 | 10/2007 | Yao et al. |
| 2007/0245050 | A1* | 10/2007 | Gregg et al. ............ 710/112 |
| 2008/0028116 | A1* | 1/2008 | Gregg et al. ............ 710/263 |
| 2008/0109891 | A1 | 5/2008 | Greenwald et al. |
| 2008/0196041 | A1* | 8/2008 | Gregg et al. ............ 719/318 |
| 2009/0094603 | A1* | 4/2009 | Hiltgen et al. ............ 718/1 |

OTHER PUBLICATIONS

Huang et al., InfiniBand Support in Xen Virtual Machine Environmant, Technical Report, OSU-CISRC-10/05-TR63, Oct. 2005, p. 1.

"Infiniband Architecture Specification vol. 1", Release 1.0.a, Jun. 19, 2001, pp. 40, 71, 193-194, 366-370, 665-667.

Wu et al., "Design of An InfiniBand Emulator over Myrinet: Challenges, Implementation, and Performance Evaluation", Technical Report, OSU-CISRC-2/01-TR, 2003, Dec. 31, p. 1.

Office Action made Final dated Dec. 8, 2010 for U.S. Appl. No. 12/036,986.

Non-Final Offica Action dated Jun. 23, 2010 for U.S. Appl. No. 12/036,986.

Non-Final Office Action dated Jan. 29, 2010 for U.S. Appl. No. 12/036,979.

Notice of Allowance dated Jun. 23, 2010 for U.S. Appl. No. 12/036,979.

Non-Final Office Action dated Oct. 1, 2010 ffor U.S. Appl. No. 12/037,046.

Non-Final Office Action dated May 17, 2010 for U.S. Appl. No. 12/037,046.

Office Action Made Final dated Aug. 12, 2010 for U.S. Appl. No. 12/051,634.

Non-Final Office Action dated Mar. 22, 2010 for U.S. Appl. No. 12/051,634.

Non-Final Office Action dated May 13, 2010 for U.S. Appl. No. 12/051,631.

Notice of Allowance dated Oct. 15, 2010 for U.S. Appl. No. 12/051,631.

Office Action Made Final dated Nov. 12, 2010 for U.S. Appl. No. 12/051,630.

Non-Final Office Action dated Jun. 1, 2010 for U.S. Appl. No. 12/051,630.

* cited by examiner

SUBNET MANAGEMENT DISCOVERY OF POINT-TO-POINT NETWORK TOPOLOGIES

BACKGROUND OF THE INVENTION

1. Field of Invention

The present disclosure relates generally to network management, and in particular, to subnet management discovery of point-to-point network topologies.

2. Description of Background

InfiniBand® Architecture (IBA) is an industry standard architecture for connecting complex systems. Particularly, InfiniBand® (IB), which is a form of System Area Network (SAN), defines a multicast facility that allows a Channel Adapter (CA) to send a packet to a single address and have it delivered to multiple ports. The InfiniBand® Architecture is described in the InfiniBand® standard, which is available at http://www.infinibandta.org, and also hereby incorporated in its entirety by reference.

BRIEF SUMMARY OF THE INVENTION

An exemplary embodiment includes a computer program product for subnet management discovery of point-to-point network topologies. The computer program product includes a tangible storage medium readable by a processing circuit and storing instructions for execution by the processing circuit for performing a method. The method includes discovering a local portion of a subnet representing the point-to-point network, the discovering facilitated by a coupling subnet manager configured to act as a master subnet manager on the local portion of the subnet, interpreting a state of a physical port associated with the coupling subnet manager, and discovering a remote portion of the subnet physically connected to the physical port based on the interpreting.

Another exemplary embodiment includes an apparatus for subnet management discovery of point-to-point network topologies. The apparatus includes a logical switch representation of at least one physical port, where the logical switch representation is managed through a coupling subnet manager. The apparatus further includes a logical host channel adapter (HCA) representation of at least one host channel adapter, where the logical HCA representation is managed by the coupling subnet manager. The apparatus further includes a logical connection between the logical switch representation and the logical HCA representation configured to enable communications between the host channel adapter and the physical port, where the communications are managed through the coupling subnet manager. According to the apparatus, the coupling subnet manager resides on the logical switch representation and is configured to perform discovery of a topology of a subnet including the logical switch representation and the logical host channel adapter.

A further exemplary embodiment includes a method for subnet management discovery of point-to-point network topologies. The method includes discovering a local portion of a subnet representing the point-to-point network, the discovering facilitated by a coupling subnet manager configured to act as a master subnet manager on the local portion of the subnet, interpreting a state of a physical port associated with the coupling subnet manager, and discovering a remote portion of the subnet physically connected to the physical port based on the interpreting.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
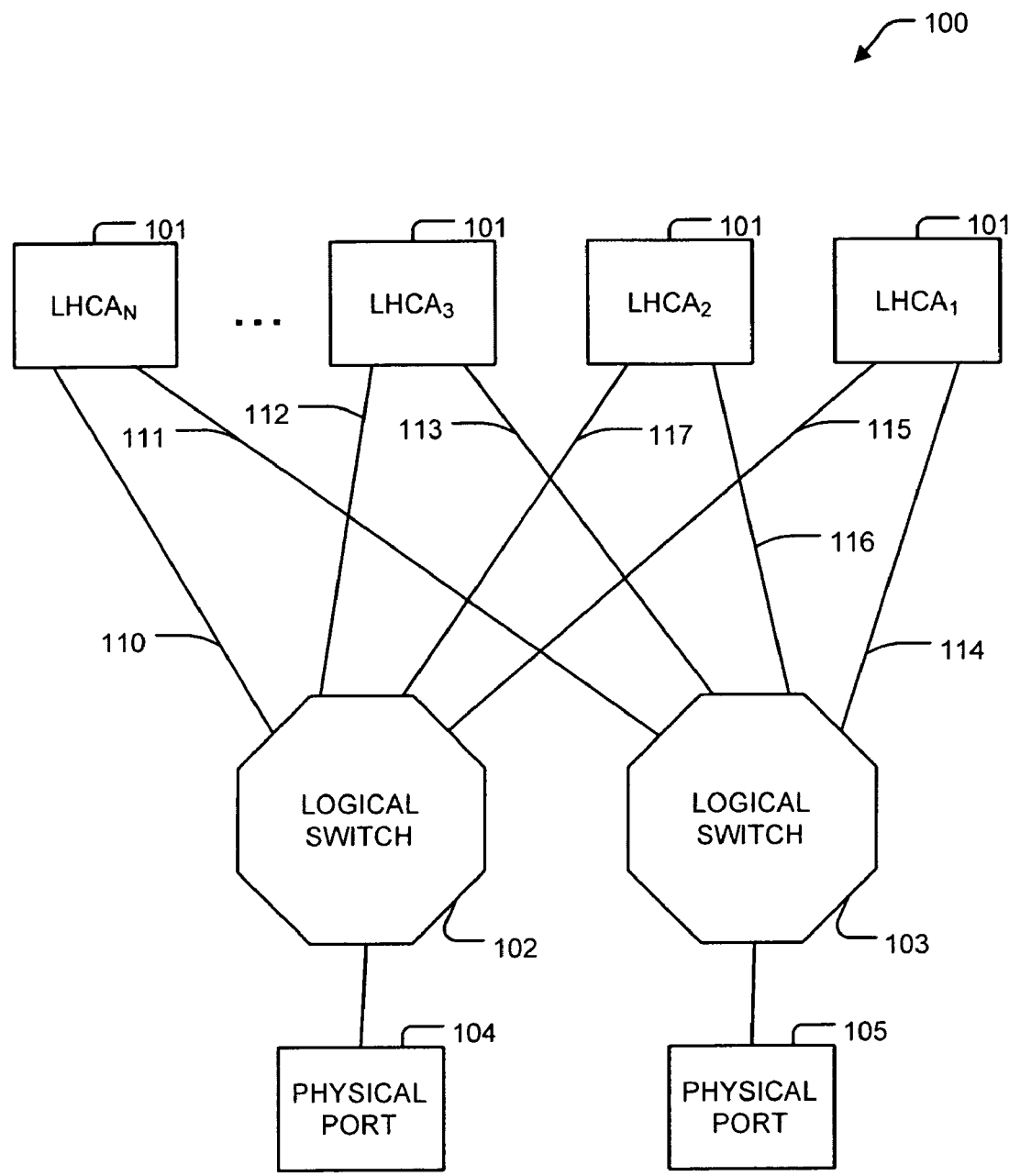
FIG. 1 illustrates logical entities of a network topology, according to an example embodiment.

The detailed description explains the preferred embodiments of the invention, together with advantages and features, by way of example with reference to the drawings.

DETAILED DESCRIPTION OF THE INVENTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of this disclosure and the associated claims.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides a method of subnet management discovery of point-to-point network topologies. Technical effects of example embodiments include the ability to manage the topology of logical switches and logical host channel adapters within the boundaries of a physical host channel adapter. The topology may be managed through use of a Coupling Subnet Manager (CSM) existing on a logical switch of the subnet. There may be one instance of a CSM per logical switch, in comparison to one subnet manager existing on each physical host channel adapter.

The InfiniBand® Architecture (IBA) defines a fabric (or IBA fabric) as a collection of links, switches, and routers that connects a set of channel adapters. IBA defines two types of channel adapters, Host Channel Adapters (HCA) and Target Channel Adapters (TCA). Host channel adapters provide an interface between a processor complex and the IBA fabric, while target channel adapters provide an interface between the IBA fabric and an I/O device.

IBA supports logical partitioning (LPAR) and LPAR environments. The term LPAR applies to both the concept of Logical Partitioning and to an LPAR image itself. A physical HCA (pHCA) provides several hardware facilities that manage the isolation between individual LPARs. Implementing the logical partitioning of a single pHCA uses the concept of multiple logical host channel adapters (LHCAs) connected by one or more logical switches (LSwitches).

The InfiniBand® Fabric Interface (IBFI) refers to communication entities that attach to the LSwitch. These communication entities may be functionally defined as a logical host channel adapter (LHCA), which is the default definition used herein.

The HCA system implementation to support LPAR results in each physical port of the HCA presenting the image of a logical switch (LSwitch). In addition to the LSwitch port that corresponds to the physical port of the HCA, the LSwitch has a port for each defined LPAR image in the physical node. Each first level guest may have access to the physical HCA (pHCA) via a logical host channel adapter (LHCA). LHCAs are the logical representation of a physical Host Channel Adapter (pHCA). A LHCA provides a means in which shared access to HCA resources are managed (e.g., Queue Pairs, Completion Queues, Event Queues, Memory Regions) as observed by an operating system (OS). The LHCA represents all the elements and attributes of a physical HCA. LHCAs have one logical port (LPort) for each physical port of the HCA, and therefore each LSwitch. There may be no connections between LSwitches in network topologies of an FCA system. The entities of an example network topology are illustrated in FIG. 1.

Turning to FIG. 1, entities of a network topology are illustrated. The network 100 may include a plurality of logical host channel adapters (LHCAs 1 . . . N) 101. As described above, each LHCA may represent all the attributes of a physical host channel adapter. The network 100 further includes a plurality of logical switches (102-103). As illustrated, each logical switch 102 and 103 includes a connection or mapping to a physical port 104 and 105, respectively. Therefore, a logical switch may provide a means to utilize a physical port through logical mapping.

As further illustrated in FIG. 1, each logical switch 102 and 103 includes a port for each LHCA of the network 100. Each port is illustrated through simplified connections 110-117. Furthermore, each LHCA 101 includes a separate port for each logical switch 102 and 103 illustrated through the simplified connections 110-117. Therefore, each simplified connection of connections 110-117 may represent a connection between logical ports of each entity (i.e., each LHCA and logical switch). Additionally, the logical port connections may be grouped into subnets. Hereinafter, a more detailed explanation of subnets is provided.

A subnet is defined as a set of InfiniBand Architecture (IBA) ports and associated links that have a common Subnet ID and are managed by a common Subnet Manager. The IBA defines a Subnet Manager (SM) as an entity attached to a subnet that is responsible for configuring and managing switches, routers, and channel adapters. The SM is the entity that is responsible for the topology and connectivity of nodes throughout the subnet.

The SM communicates with a Subnet Management Agent (SMA) which resides at each node. The communication between the SM and SMA is performed using a special class of Management Datagram (MAD) called a Subnet Management Packet (SMP) which is directed to a special queue pair 0 (QP0). All other management traffic may utilize queue pair 1 (QP1). There may be two types of SMPs, Local ID (LID) Routed and Directed Route SMPs. LID routed SMPs are forwarded through the subnet based on the LID of the destination. Directed route SMPs are forwarded through the subnet based on a vector of port numbers that define a path through the subnet. Directed route SMPs are used to implement several management functions, for example, before LIDs are assigned to the nodes.

The Subnet Management Interface (SMI) is associated with QP0. QP0 is used exclusively for sending and receiving SMPs, whether they are destined for the SM or the SMA at the node. Communications with the SMA in a channel adapter, switch, or router is always through the SMI. Only SMAs and SM communicate through this interface.

Figure 2:
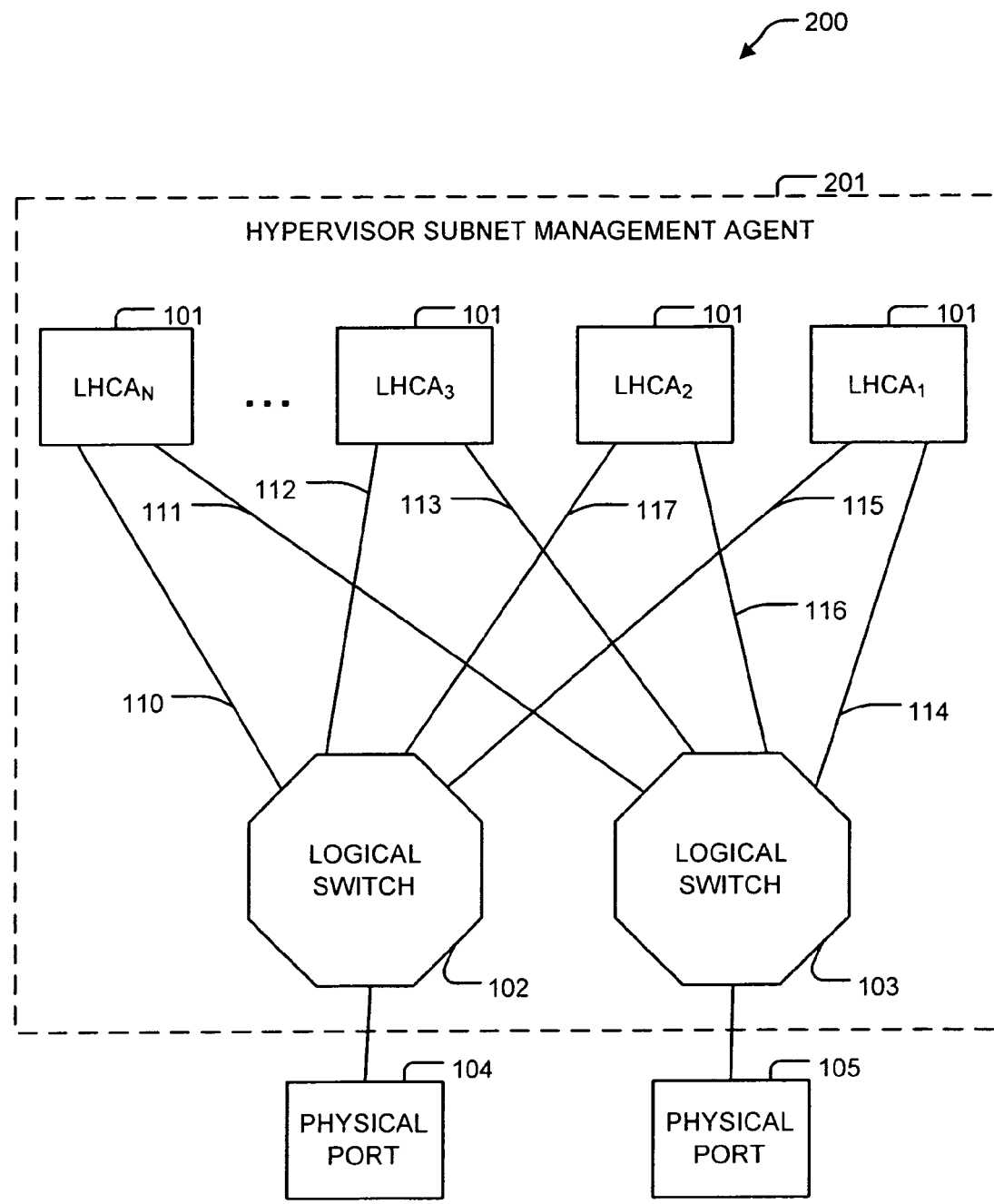
FIG. 2 illustrates a hypervisor subnet management interface, according to an example embodiment.

According to example embodiments, because a Host Channel Adapter (HCA) appears to the IB fabric as a multitude of nodes, the SMI for each of these nodes is a single shared SMI, termed the hypervisor SMI (hSMI). Turning to FIG. 2, an hSMI is illustrated, according to an example embodiment.

According to FIG. 2, the hSMI 200 includes all logical entities (nodes) associated in the subnet. For example, all QP0 traffic that arrives at a node within the physical HCA (pHCA) is first routed to the hSMI. The hSMI function owns the receive queue of the queue pair 0 (QP0) for each physical port (pPort) of the physical HCA (pHCA). Because there can be only one real QP0, the HCA uses real QP0 for physical port 104 and real QP2 (alias QP0) for pPort 105.

Likewise, each of these nodes within the pHCA is considered to have its own SMA. According to example embodiments, all of the SMA entities are implemented in the hypervisor code, and are collectively referred to as the hypervisor SMA (hSMA) 201.

It is the responsibility of the hSMA 201 to respond to the SM in such a way that it is impossible to distinguish the logical switches and logical HCAs defined by the HCA Architecture, from real physical IB switches and HCAs. However, example embodiments are not limited to nodes of a subnet having fully functional Subnet Managers (SMs). For example, according to example embodiments, a Coupling Subnet Manager (CSM) may reside within the boundaries of a physical HCA, and would perform limited functions compared to a fully functional SM as described above.

For example, a CSM may discover the topology of a subnet, assign Local Identifiers (LIDs) to the nodes of the subnet, establish possible paths among the nodes, discover topology changes of the subnet, and manage changes to the subnet as nodes are added or deleted. A CSM may operate in a "fixed configuration" environment, such as a subnet environment where the CSM pass/receive only directed route SMPs. Alternatively, the CSM may also pass/receive LID routed SMPs (e.g., traps). The fixed configuration may include a fixed point-to-point configuration of a subnet consisting of a physical connection between two physical ports (e.g., a fiber optic connection). The two physical ports may be two physical ports on the same HCA, or two physical ports on separate HCAs. A logical switch may exist behind each physical port. Hereinafter, example subnets according to fixed configurations are explained more fully with reference to FIGS. 3 and 4.

Figure 3:
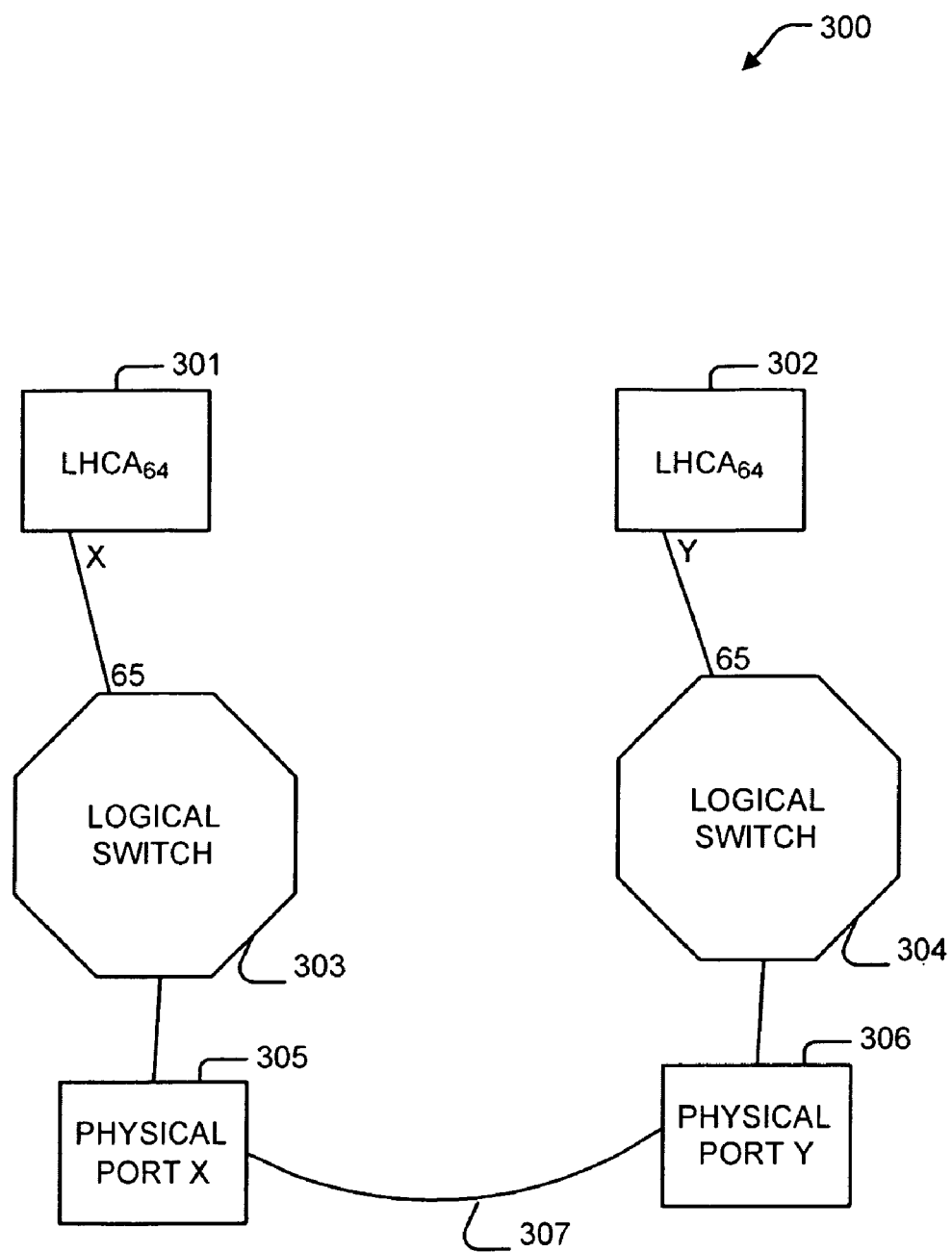
FIG. 3 illustrates an example subnet, in accordance with example embodiments.

Turning to FIG. 3, an example subnet is illustrated. The subnet 300 may include logical switches 303 and 304. Each of the logical switches 303 and 304 may include a CSM. It is noted that only one CSM should manage the entire subnet. For example, if the CSM existing on Logical Switch 303 is "master," the CSM existing on Logical Switch 304 should not be active.

Figure 4:
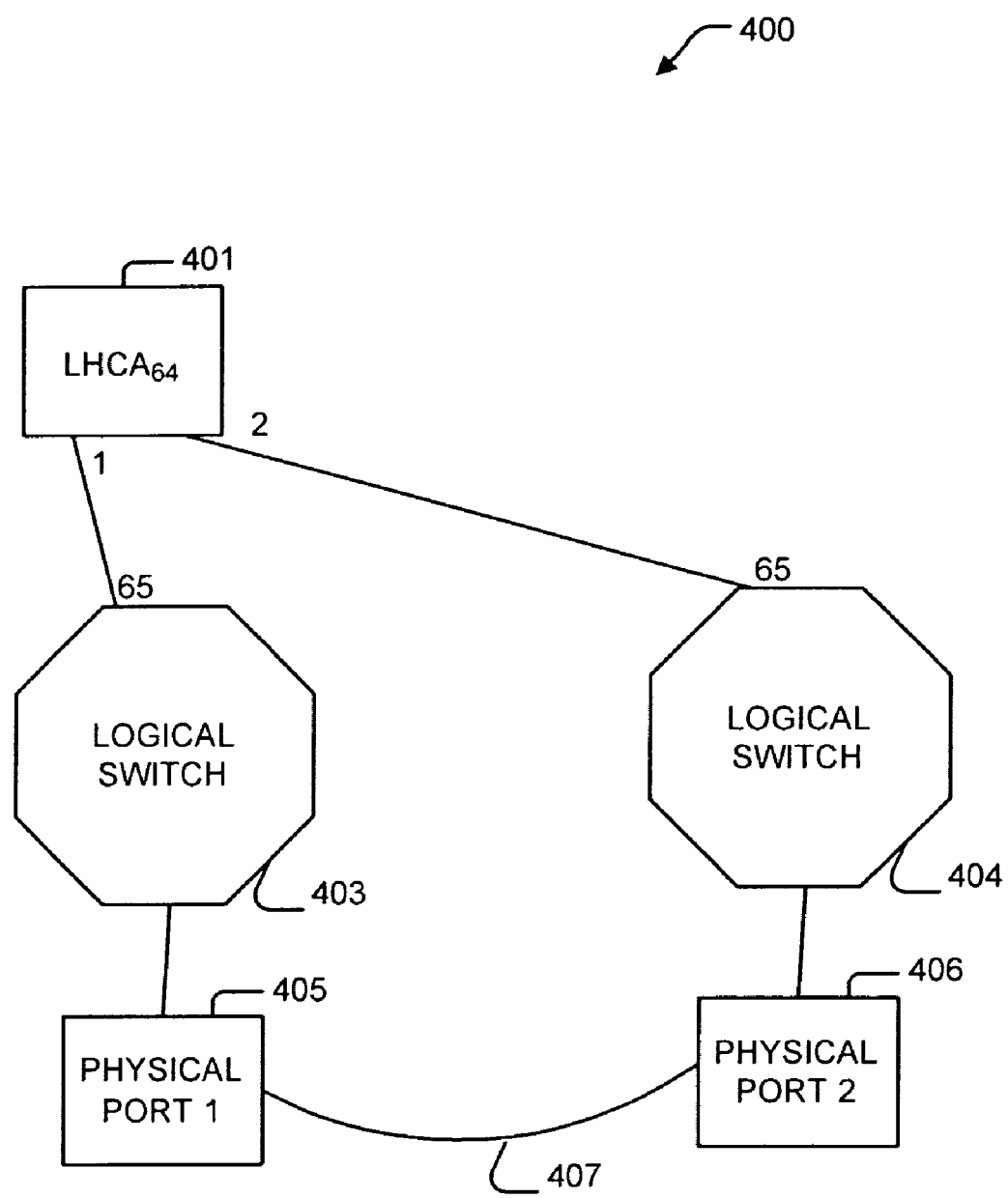
FIG. 4 illustrates an example subnet, in accordance with example embodiments.

The subnet 300 further includes logical host channel adapters (LHCA) 301 and 302. Each LHCA 301 and 302 is connected to one Logical Switch (303 and 304, respectively). Furthermore, each Logical Switch 303 and 304 may have a connection or mapping a physical port 305 or 306 (for example, see description above regarding FIGS. 1-2). In the example subnet 300, one physical connection 307 exists between physical port 305 and physical port 306. Therefore, subnet 300 is a fixed configuration including a physical connection between two physical ports on separate HCAs. Turning to FIG. 4, another example subnet is illustrated.

According to FIG. 4, a single LHCA 401 includes connections to two logical switches 403 and 404. Furthermore, each logical switch 403 and 404 includes a connection to a single physical port 405 or 406. Additionally, there is a physical connection 407 between physical port 405 and 406. Thus, example subnet 400 is a fixed configuration including a physical connection between two physical ports on the same HCA.

It is noted that in fixed configuration subnets as illustrated in FIGS. 3-4, a master CSM existing on a single logical switch may discover the topology of the point-to-point network or subnet. However, as noted above, each logical switch may include a CSM. The CSM at each switch may manage a Coupling Subnet Manager Control Block facilitating discovery of the topology of the subnet. A hypervisor subnet manager agent master directory existing on a physical host channel adapter (i.e., one master directory per physical HCA) may include a pointer to the CSM control block. An example Table 1 is provided below which sets forth an exemplary format for a Coupling Subnet Manager control block according to the above description:

TABLE 1

Coupling SM Control Block

Header (fields common to both pPorts on the HCA)
CSM Data for pPort 1 or pPort[0]
CSM Data for pPort 2 or pPort[1]

As set forth in Table 1 above, a CSM control block may include header information as well as CSM information for each physical port of the physical HCA. The CSM information may be in the form of an array consisting of data specific to each physical port. For example, using queue pair information for each physical port, an array index may be calculated for each physical port (e.g., QP0 may be interpreted as array index 0, etc). Using the CSM control block, the CSM of a logical switch on the subnet (e.g., 300 or 400) may discover the topology of the subnet using the methodologies described herein.

Figure 5:
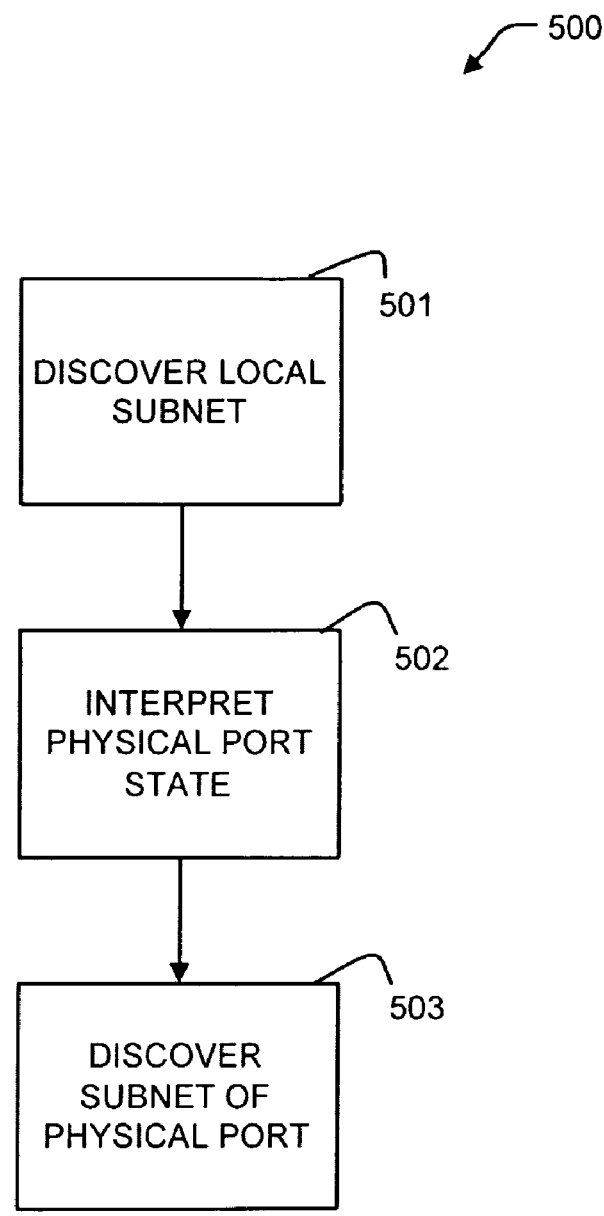
FIG. 5 illustrates a method of discovery of point-to-point network topologies, according to an example embodiment.

Turning to FIG. 5, method 500, a method of discovery of point-to-point network topologies, is illustrated. Method 500 includes discovering a local portion of the subnet at block 501. For example, a CSM at a logical switch of the subnet may transmit SMPs using a queue pair number. The SMP may be built in memory, and passed to a service routine. The service routine may post the SMP on the queue associated with the queue pair number, thus the SMP is posted on the send queue of a physical port connected to the logical switch on which the CSM resides. Thereafter, or at substantially the same time, the CSM may receive a response packet.

Upon receipt of the response packet, the CSM may update a discovery state of the subnet to reflect that discovery is being performed. The discovery state is further updated as the discovery of the subnet progresses. For example, the CSM may transmit SMPs requesting information regarding nodes on the subnet. As responses are received from associated nodes, local Ids may be issued by the CSM. Each local ID may be assigned according to the particular logical device associated with the node. For example, a logical ID of 0x02 may be assigned to a port of a local LHCA.

Turning back to FIG. 5, the method 500 further includes interpreting the state of the physical port connected to its logical switch at block 503. For example, the CSM may issue requests for port state information. The CSM may receive information regarding the state of the physical port in response to the requests. For example, the physical port state may include an active state or an inactive state, or any suitable port state. If the port is active, or "up," the CSM may discover the portions of the subnet residing on a terminal side of the connection to the physical port. More clearly, if the port is active, there may be a connection to another physical switch present. Therefore, additional nodes on the subnet may exist (e.g., additional logical switches, LHCAs, etc.). If the port state is inactive, discovery of the subnet is complete.

The method 500 further includes discovering the portions of the subnet connected to the physical port at block 503. If the physical port is active, the CSM of the local portion of the subnet may have to negotiate with the CSM of the discovered portion of the subnet to determine which CSM will continue as "master" of the subnet. Furthermore, the retained "master" CSM of the subnet will issue requests for information regarding nodes of the discovered portion of the subnet. Upon receipt of responses to the requests, the master CSM may issue local IDs to the nodes of the discovered portion of the subnet. Upon discovery of all nodes on the remote portion of the subnet, discovery of the topology of the subnet is complete. Hereinafter, a more detailed description of the methodologies associated with subnet topology discovery is provided with reference to FIG. 6.

Figure 6:
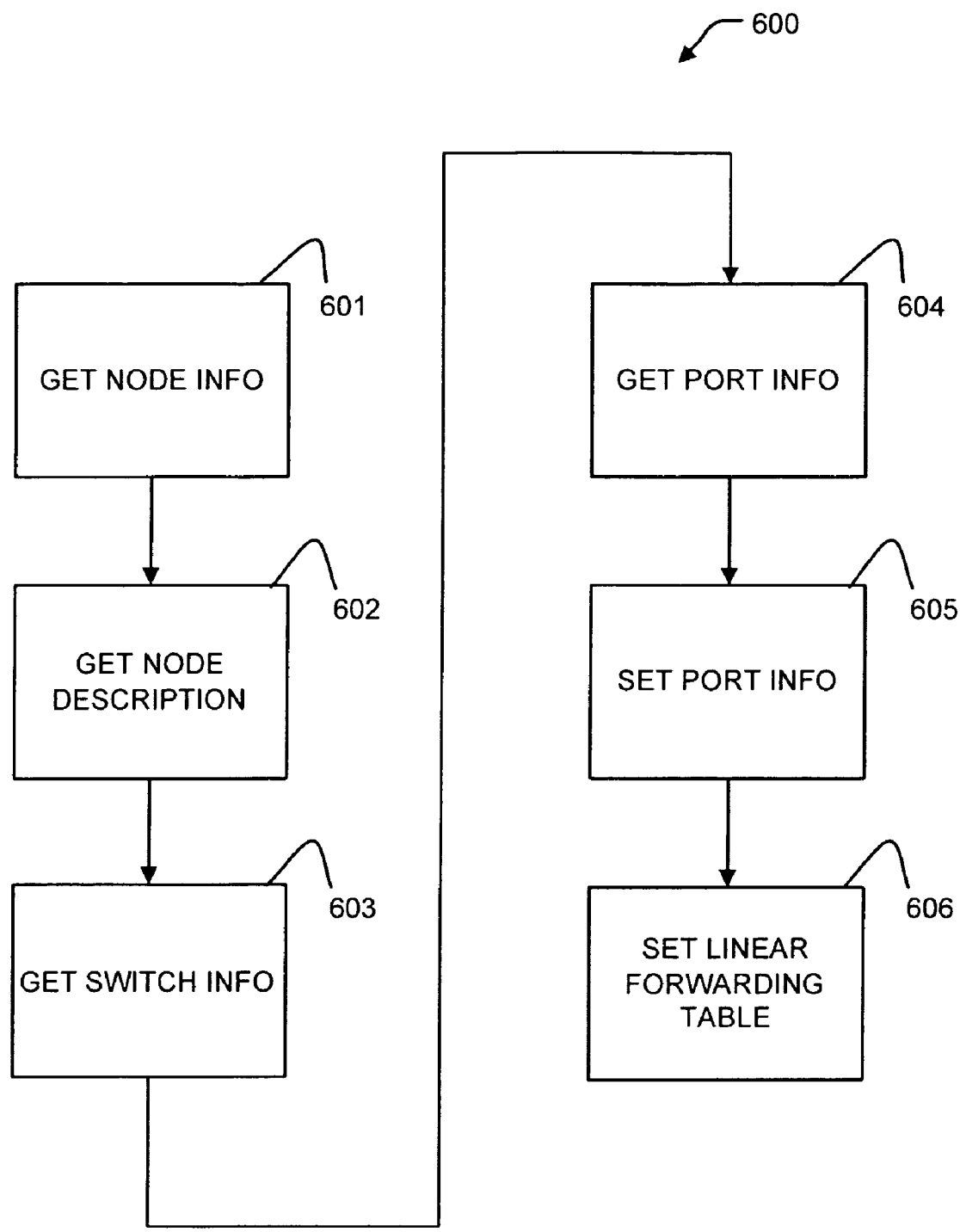
FIG. 6 illustrates a method of discovery of point-to-point network topologies, according to an example embodiment.

According to FIG. 6, a method 600 for discovery of point-to-point network topologies is illustrated. The method 600 includes getting node information at block 601. For example, a request for node information may be issued by a master CSM. Thereafter, a response including the requested node information may be received at the CSM. The node information may include information pertaining to whether a node exists on the subnet, and any previously issued identifiers for the node.

The method 600 further includes getting node description information at block 602. For example, a request for node description information may be issued by a master CSM. Thereafter, a response including the node description information may be received at the CSM. The node description information may include a description of the type of node, for example, switch, HCA, etc.

The method 600 further includes getting switch information at block 603. For example, if the node description received at block 602 includes a description of a switch, the master CSM may issue a request for switch information.

The method 600 further includes getting port information at block 604. For example, the CSM may issue a request for port information of a node discovered on the subnet. The port information may include any identifiers of the node. The port information may be received at the master CSM.

The method 600 further includes setting port information at block 605. For example, if the CSM performing subnet discovery is the master CSM, said master CSM may issue port identifiers at block 605. The port identifiers (e.g., local ID) may override any previously issued port identifiers.

The method 600 further includes setting a linear forwarding table at block 606. The linear forwarding table may include any information necessary looking up local IDs on the subnet.

Therefore, as described above, example embodiments include methodologies for subnet management discovery of network topologies. The networks may be point-to-point networks in a fixed configuration as described herein. Furthermore, during discovery, a coupling subnet manager may issue local identifiers to nodes corresponding to the subnet topology, thereby facilitating description of the subnet topology.

It is noted that several steps or operations may be omitted from the example methodologies set forth herein depending upon any particular implementation. Additionally, steps or operations noted in the figures may be performed in any suitable order, depending upon any particular implementation. For example, blocks of FIGS. 5-6 may be performed in different orders depending upon the state of a subnet. Node information and/or node descriptions may be received concurrently, or separately. Switch information may be received with node information and/or node description information. Moreover, port information and/or linear forwarding information may be set according to the "master" status of a CSM performing the methodologies described herein.

Figure 7:
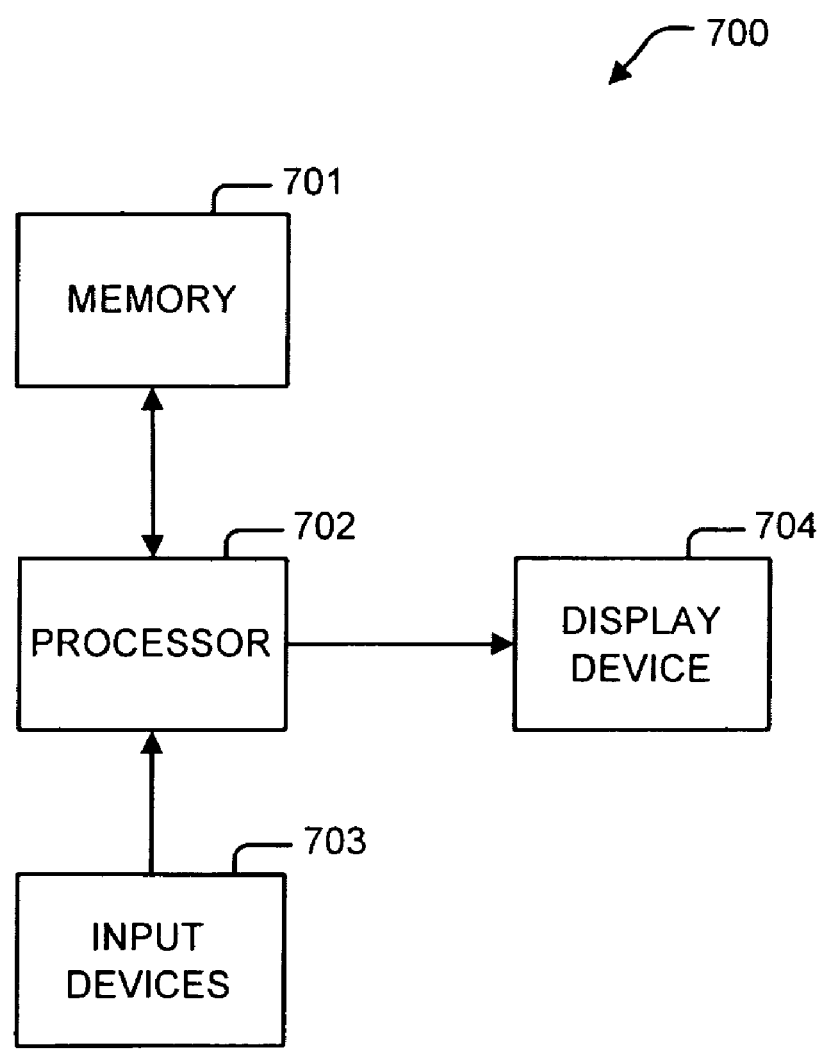
FIG. 7 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 7 illustrates a computer apparatus, according to an exemplary embodiment. Therefore, portions or the entirety of the methodologies described herein may be executed as instructions in a processor 702 of the computer system 700. The computer system 700 includes memory 701 for storage of instructions and information, input device(s) 703 for computer communication, and display device 704. Thus, the present invention may be implemented, in software, for example, as any suitable computer program on a computer system somewhat similar to computer system 700. For example, a program in accordance with the present invention may be a computer program product causing a computer to execute the example methods described herein.

The computer program product may include a computer-readable medium having computer program logic or code portions embodied thereon for enabling a processor (e.g., 702) of a computer apparatus (e.g., 700) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A computer program product for subnet management discovery of point-to-point network topologies, the computer program product comprising:
    a non-transitory storage medium readable by a processing circuit and storing instructions for execution by the processing circuit for performing a method comprising:
    discovering a local portion of a subnet representing the point-to-point network, the discovering facilitated by a coupling subnet manager of a logical switch of the subnet, the coupling subnet manager configured to act as a master subnet manager on the local portion of the subnet;
    interpreting a state of a physical port associated with the coupling subnet manager;
    discovering a remote portion of the subnet physically connected to the physical port based on the interpreting; and
    setting a linear forwarding table including local identifier information on the remote portion of the subnet.

2. The computer program product of claim 1, wherein the method further comprises:

transmitting a request for node information to the remote portion of the subnet; and receiving the node information in response to the request.

3. The computer program product of claim 1, wherein the method further comprises:

transmitting a request for node description information to the remote portion of the subnet; and receiving the node description information in response to the request.

4. The computer program product of claim 1, wherein the method further comprises:

transmitting a request for switch information to the remote portion of the subnet; and receiving the switch information in response to the request.

5. The computer program product of claim 1, wherein the method further comprises:

transmitting a request for port information to the remote portion of the subnet; and receiving the port information in response to the request.

6. The computer program product of claim 1, wherein the method further comprises:

setting port information on the remote portion of the subnet.

7. The computer program product of claim 1, wherein the non-transitory storage medium includes a rewriteable non-volatile storage medium, a flash storage medium, a hard disk, an optical storage medium, a magneto-optic storage medium, or a magnetic storage medium.

8. The computer program product of claim 1, wherein discovering the local portion of the subnet includes setting local identifier information for nodes of the local portion of the subnet.

9. An apparatus for subnet management discovery of point-to-point network topologies, the apparatus comprising:

at least one processor;

a logical switch representation of at least one physical port, wherein the logical switch representation is managed through a coupling subnet manager;

a logical host channel adapter (HCA) representation of at least one host channel adapter, wherein the logical HCA representation is managed by the coupling subnet manager; and a logical connection between the logical switch representation and the logical HCA representation configured to enable communications between the host channel adapter and the physical port, wherein the communications are managed through the coupling subnet manager; wherein, the coupling subnet manager resides on the logical switch representation and is configured to perform discovery of a topology of a subnet including the logical switch representation and the logical host channel adapter.

10. A computer-implemented method for subnet management discovery of point-to-point network topologies, the method comprising:

discovering a local portion of a subnet representing the point-to-point network, the discovering facilitated by a coupling subnet manager of a logical switch of the subnet, the coupling subnet manager configured to act as a master subnet manager on the local portion of the subnet;

interpreting a state of a physical port associated with the coupling subnet manager;

discovering a remote portion of the subnet physically connected to the physical port based on the interpreting; and setting a linear forwarding table including local identifier information on the remote portion of the subnet.

11. The method of claim 10, wherein the method further comprises:

transmitting a request for node information to the remote portion of the subnet; and receiving the node information in response to the request.

12. The method of claim 10, wherein the method further comprises:

transmitting a request for node description information to the remote portion of the subnet; and receiving the node description information in response to the request.

13. The method of claim 10, wherein the method further comprises:

transmitting a request for switch information to the remote portion of the subnet; and receiving the switch information in response to the request.

14. The method of claim 10, wherein the method further comprises:

transmitting a request for port information to the remote portion of the subnet; and receiving the port information in response to the request.

15. The method of claim 10, wherein the method further comprises:

setting port information on the remote portion of the subnet.

16. The method of claim 10, wherein the subnet includes a single physical connection between two physical ports of the subnet.

17. The method of claim 10, wherein discovering the local portion of the subnet includes setting local identifier information for nodes of the local portion of the subnet.

* * * * *